United States Patent
Hiruma et al.

(10) Patent No.: US 7,095,149 B2
(45) Date of Patent: Aug. 22, 2006

(54) MAGNETIZATION PATTERN OF ROTOR MAGNET FOR STEPPING MOTOR

(75) Inventors: Shuichi Hiruma, Tokyo (JP); Takanori Sakamoto, Tokyo (JP); Shigeyuki Shimomura, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/917,332

(22) Filed: Aug. 13, 2004

(65) Prior Publication Data

US 2005/0264120 A1 Dec. 1, 2005

(30) Foreign Application Priority Data

May 26, 2004 (JP) ............... P.2004-155935

(51) Int. Cl.
*H02K 37/14* (2006.01)

(52) U.S. Cl. ............... 310/156.44; 310/156.43

(58) Field of Classification Search ........... 310/156.44, 310/156.45, 156.43
See application file for complete search history.

(56) References Cited

U.S. PATENT DOCUMENTS

| 4,458,184 | A | * | 7/1984 | Kawate | ............... 318/254 |
|---|---|---|---|---|---|
| 4,700,098 | A | * | 10/1987 | Kawashima | ............... 310/186 |
| 4,739,203 | A | * | 4/1988 | Miyao et al. | ............... 310/67 R |
| 4,968,913 | A | * | 11/1990 | Sakamoto | ............... 310/156.05 |
| 5,107,159 | A | * | 4/1992 | Kordik | ............... 310/156.44 |
| 6,791,223 | B1 | * | 9/2004 | Suzuki et al. | ............... 310/156.43 |

FOREIGN PATENT DOCUMENTS

| JP | 11-22352 A | * | 5/1989 |
| JP | 2-114848 | | 4/1990 |
| JP | 10-248232 A | * | 9/1998 |

* cited by examiner

*Primary Examiner*—Burton Mullins
(74) *Attorney, Agent, or Firm*—Whitham, Curtis, Christofferson & Cook, PC

(57) ABSTRACT

A magnetization pattern of a rotor magnet for a stepping motor includes a plurality of magnetization portions, which is provided on the rotor magnet in a rotation direction of the rotor magnet. The magnetization portions have different magnetic poles which are alternately arranged. Some magnetization portions of the magnetization portions have respectively magnetization widths A. Said some magnetization portions are opposed each other with a rotary axis or the rotor magnet as a center among said some magnetization portions. The other magnetization portions of the magnetization portions have respectively uniform widths B. Each of the magnetization widths A is greater than that of the uniform widths B.

3 Claims, 4 Drawing Sheets

MAGNETIZATION PATTERN OF ROTOR MAGNET FOR STEPPING MOTOR

BACKGROUND OF THE INVENTION

This invention relates to a magnetization pattern of a stepping motor. More particularly, the invention relates to a magnetization pattern of a stepping motor for reducing vibration and noise that occur during driving of the motor by changing a magnetization balance of magnetic poles in a rotating direction of a rotor magnet.

The stepping motor of this kind has been used appropriately in the past as an intermittent driving source of various kinds of appliances such as a printer, a facsimile, a disk drive, and so forth. In the stepping motor, a rotor is arranged rotatably inside a stator having a pole tooth, and the rotor has at its outer peripheral portion a cylindrical rotor magnet formed of a permanent magnet. When the stepping motor serially switches the supply of power to excitation coils of the stator magnetic poles, the rotor Is rotated and driven relative to the stator.

In the rotor magnet 1, N poles and S poles are alternately magnetized in multiple poles at a plurality of positions and with an equal spacing among them in a circumferential direction of the rotor magnet 1 as shown in FIG. 3. The plurality of magnetization portions 2 is formed into a mutually equal arcuate magnetization width C. Incidentally, in the drawing, when the total number of poles of the rotor magnet 1 is y and a center angle of the arcuate equal width C of the magnetization portions 2 is x°, they satisfy the relation $x°=360°/y$.

When the rotor magnet 1 comes off from a stability point during non-supply of power in the stepping motor, a retaining torque, that is, a detent torque, for returning the rotor magnet 1 to the stability point occurs between the rotor magnetic poles and the pole teeth as shown in FIG. 4. As performances of various appliances described above have become higher in recent years, a stepping motor having a lower detent torque has been required. When the detent torque of the motor is great, a torque ripple and a rotating speed ripple of the motor increase with the result of the occurrence of problems such as vibration and noise. When the stepping motor is used for a positioning motor, positioning accuracy drops.

To reduce the detent torque, a magnetization pattern of a motor is known in which a center of each magnetic pole of a magnetization pattern at a half portion of the rotor magnet 1 in a rotating direction of a stepping motor is deviated by ¼ of a magnetization pitch from the center of each magnetic pole of the magnetization pattern of the other half portion of the rotor magnet 1, and a discontinuous portion occurring in the proximity or the boundary between these two half portions is formed into a non-magnetization portion (See, for example, JF-A-Z-114848).

The magnetization pattern of the related stepping motor described above can offset the detent torque as the phase of the detent torque occurring in the other half portion is inversed with respect to the phase of the detent torque occurring in one of the half portions. However, because the discontinuous portion occurring in the proximity of the boundary of the two half portions is formed into the non-magnetization portion, this non-magnetization drastically lowers the driving torque during driving and the stepping motor is not suitable for the practical application.

SUMMARY OF THE INVENTION

Therefore, a technical problem for making the drop of the driving torque small and eliminating the problems of vibration and noise by reducing the detent torque arises, and the invention aims at solving this problem.

In order to achieve the above object, according to the present invention, there is provided a magnetization pattern of a rotor magnet for a stepping motor, comprising:

a plurality of magnetization portions, which is formed on the rotor magnet in a rotation direction of the rotor magnet, wherein the magnetization portions have different magnetic poles which are alternately arranged on the rotor magnet;

wherein some magnetization portions of the magnetization portions have respectively magnetization widths A;

wherein said some magnetization portions are opposed each other with a rotary axis of the rotor magnet as a center among said some magnetization portions;

wherein the other magnetization portions of the magnetization portions have respectively uniform widths B; and wherein each of the magnetization widths A is greater than that of the uniform widths B.

According to this construction, the magnetization width A of the set or wide magnetization portions of the rotor magnet opposing each other is formed into a greater width than the magnetization portions having the uniform width B at the remaining positions. Therefore, a local change of a magnetic flux distribution occurs in regions in the proximity of the wide magnetization portions as the center and the detent torque of the magnetization portions of the rotor magnet drops as a whole.

Also, according to this construction, the magnetization width A of the mutually opposing magnetization portions is so formed as to be greater than the magnetization width B of the rest of the magnetization portions. Since the change occurs in the distribution condition of the magnetic flux and the detent torque decreases, it is possible to reduce the drop of the driving torque of the stepping motor and to eliminate vibration and noise of the rotor. Smooth motor driving with less vibration can be acquired particularly at the time of low speed driving.

Preferably, a total number or said some magnetization portions having the magnetization widths A is a one set which is constituted by two magnetization portions.

According to this construction, the magnetic flux distribution of the entire rotor magnet can be formed to be symmetric with respect to one axis by merely disposing the wide magnetization portions at two positions and the minimum value of the detent torque can be acquired in each half cycle (angle: 180°).

Also, according to this construction, the minimum value of the detent torque occurs in each half cycle by merely disposing the wide magnetization portions at two positions of the rotor magnet. Therefore, in addition to the advantage of the above configuration, this configuration can easily form the wide magnetization portions and can make torque fluctuation smooth during driving or the stepping motor.

Preferably, a total number of said some magnetization portions having the magnetization widths A is two sets which is constituted by four magnetization portions. The four magnetization portions are arranged in an equal pith of 90 degrees in the rotation direction of the rotor magnet.

According to this construction, because the four wide magnetization portions are arranged at the equal angle of 90 degrees, the overall magnetic flux distribution is so formed as to be symmetric with respect to the two orthogonal axes and the minimum value of the detent torque can be obtained at each 90° angle.

Also, according to this construction, the minimum value of the detent torque occurs in each quarter cycle. Therefore, in addition to the advantage of the above configuration, this configuration can make torque fluctuation of the stepping motor further smooth and particularly when the stepping motor is used as a positioning motor, positioning accuracy with respect to a load by the motor can be as much improved.

Preferably, a total pole number of all the magnetization portions formed on the rotor magnet is defined as y, an angle obtained by dividing 360° by the total number of poles y is defined as x°, an arbitrary angle is defined as α°, a total number of said some magnetization portions having the magnetization widths A is defined as z, a center angle with respect to each of the magnetization widths A of said some magnetization portions is defined as A°, and a center angle with respect to each of the uniform widths B of said other magnetization portions is defined as B°, the following equations are satisfied, $A° = x° + (y/z - 1)α°;$ $B° = (x° - α°);$ $x° + (y/z - 1)α° > (x° - α°);$ and $x°/2 > α°.$ According to this construction, a constant change occurs in the magnetic flux distribution in the proximity of the wide magnetization portions so long as the relational formulas given above are satisfied and desired angle-torque characteristics for reducing the detent torque can be acquired.

Also, according to this constructions the total pole number y of the rotor magnet, the magnetization width of the wide magnetization portions and the magnetization portion of the narrow magnetization portions can be set to an arbitrary combination for reducing the detent torque of the stepping motor so long as the relational formulas described above are satisfied. Therefore, in addition to the advantages of the above configurations, this configuration provides the merit that design freedom of the rotor magnet and the stepping motor can be remarkably improved.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
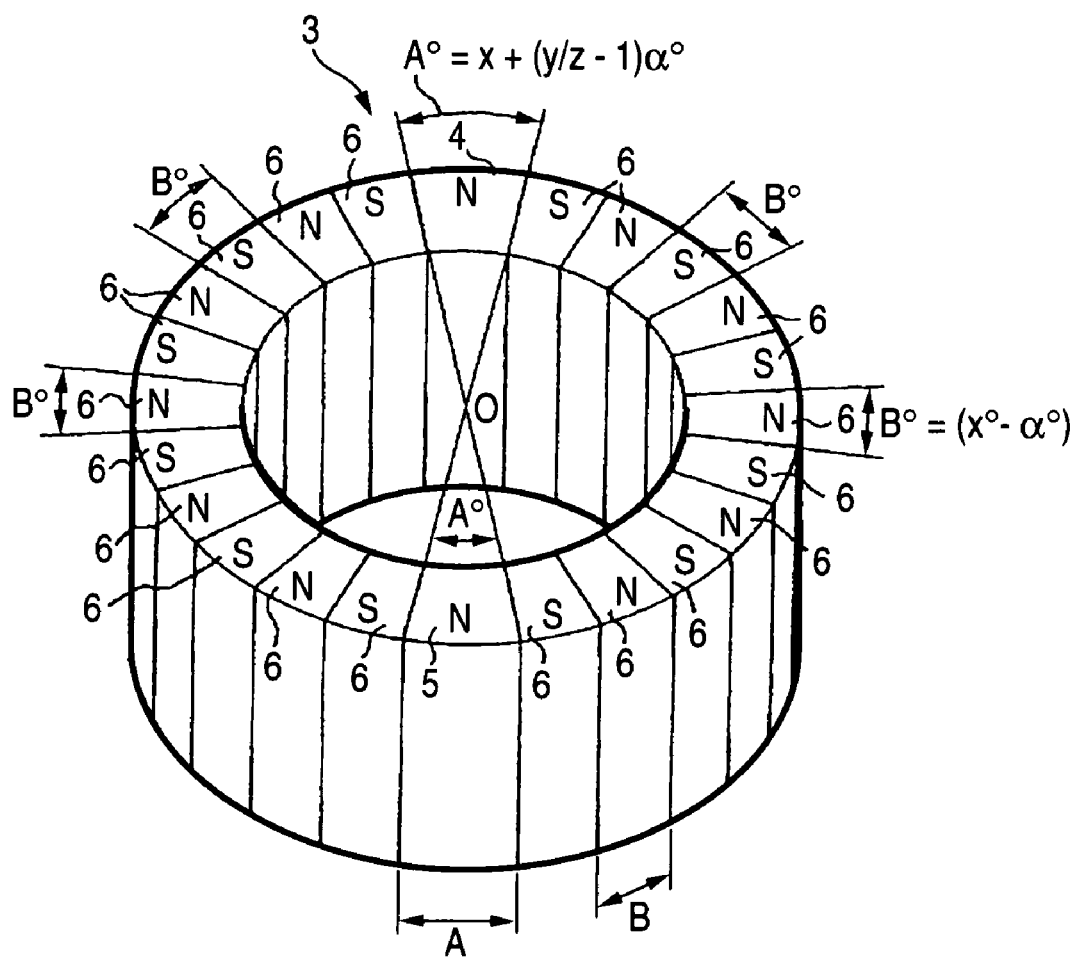
FIG. 1 is a perspective view of a rotor magnet that represents an embodiment of the invention and explains a magnetization pattern of a stepping motor.

The invention accomplishes the objects of reducing the detent torque and suppressing the occurrence of vibration and noise by selecting the magnetization width A of the magnetization portions of the rotor magnet opposing each other with the rotary shaft of the rotor magnet as the center and the magnetization width B of the magnetization portions magnetized into the equal width at a plurality of other portions among the magnetization portions of the magnetic poles in the rotating direction of the rotor magnet so that they satisfy the relation A>B.

An embodiment of the invention will be hereinafter explained with reference to FIGS. 1 and 2. In the drawings, reference numeral 3 denotes a cylindrical rotor magnet. The rotor magnet 3 is arranged rotatably inside a stator unit (not shown in the drawings) having stator magnetic poles. A core part of the rotor magnet 3 is integrally fixed to a rotary shaft disposed at the center of rotation. The rotor unit described above serially excites an excitation coil of each stator magnetic pole and the stator magnetic pole attracts or repulses the magnetic pole of the rotor magnet 3.

Figure 2:
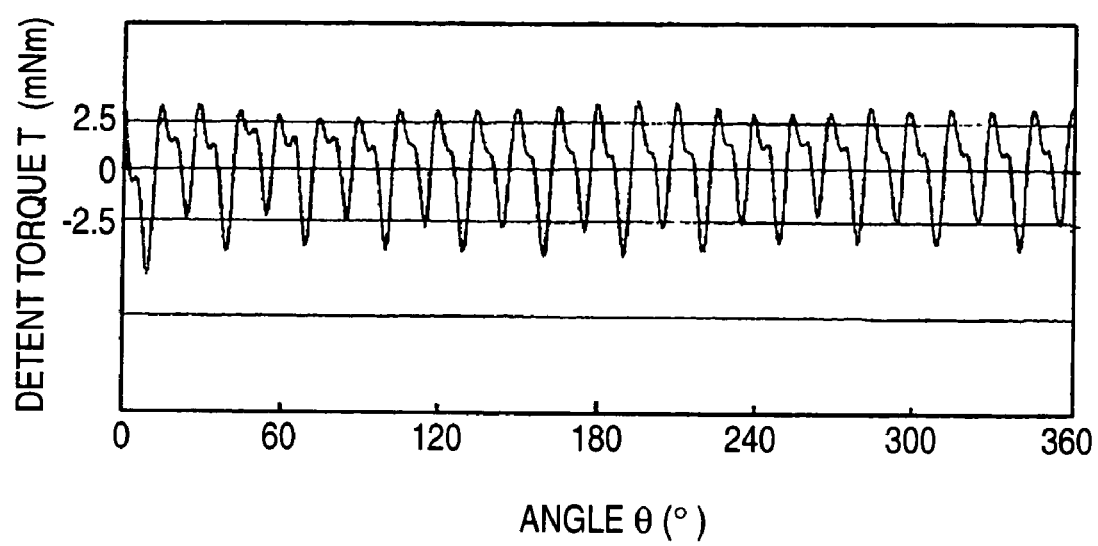
FIG. 2 is an explanatory view of angle-torque characteristics of the stepping motor shown in FIG. 1.

A large number of magnetization portions of the N pole and a large number of magnetization potions of the 3 pole are alternately formed on the rotor magnet 3 in its circumferential direction as shown in FIG. 1. The magnetization portion of the rotor magnet 3 is constituted by wide magnetization portions 4 and 5 magnetized into a predetermined arcuate magnetization width A and a plurality of narrow magnetization portions 6 magnetized into an equal arcuate magnetization width B at a plurality of remaining portions.

Two wide magnetization portions 4 and 5 opposing each other while interposing the center of revolution O of the rotor magnet 1 between them form a set and in the example shown In the drawings, the wide magnetization portions 4 and 5 are arranged at two positions forming one set. The magnetization width A of the wide magnetization portions 4 and 5 is so formed as to be greater by a predetermined width than the magnetization width B of the narrow magnetization portions 6.

Figure 3:
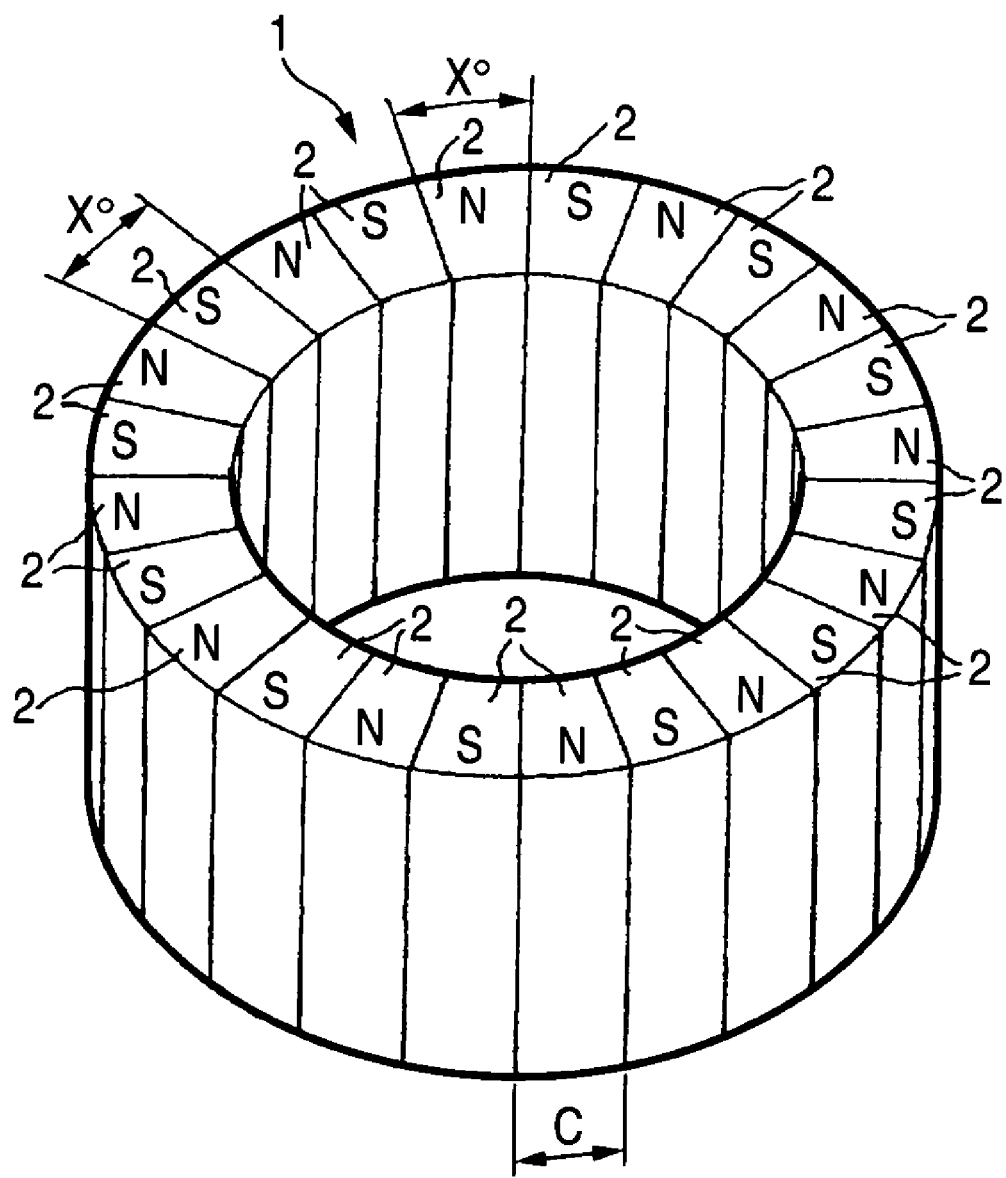
FIG. 3 is a perspective view of a rotor magnet for explaining a magnetization pattern of the related stepping motor.
Figure 4:
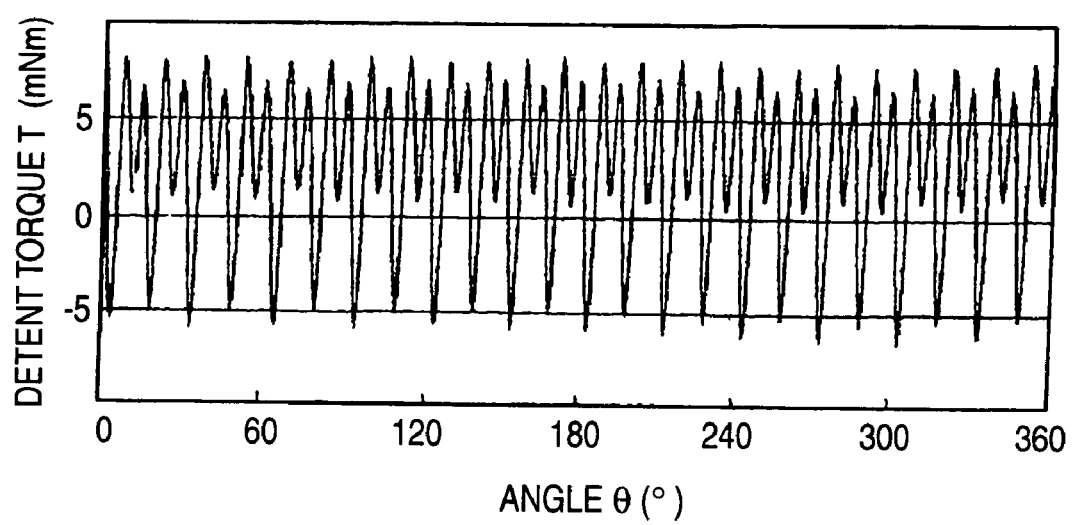
FIG. 4 is an explanatory view of angle-torque characteristics of the stepping motor shown in FIG. 3.

When the wide magnetization portions 4 and 5 are so formed in this way as to be wider than the narrow magnetization portions 6, a predetermined change occurs the distribution state of the magnetic flux in regions in the proximity of the two wide magnetization portions 4 and 5 unlike the magnetization pattern of the related stepping motor shown in FIG. 3 and so-called "detent torque", in which non-uniformity occurs when the rotary shaft is rotated from outside during non-excitation, can be reduced. In other words, because the wide magnetization portions 4 and 5 are formed into a large width and the balance of the magnetization width of the overall rotor magnet 3 is changed, the attraction force to the different poles on the stator side adjacent to the magnetization portions 4 and 5 increases to a certain extent around the wide magnetization portions 4 and 5 whereas the repulsive force to the same poles on the stator side increases, too. Because the detent torque is thus offset locally, the rotor magnet 3 generates the magnetic flux density distribution that reduces the detent torque as a whole, so that the detent torque presumably decreases.

The example shown in the drawings represents the application to a PM (Permanent Magnet) type stepping motor having 48 pole teeth in the stator. More specifically, this is the application to a motor in which the total pole number y of the wide magnetization portions 4 and 5 and the narrow magnetization portions 6 of the rotor magnet 3 is 24, an angle x° as the quotient obtained by dividing the angle 360° by the total pole number y is 15° and an arbitrary angle α° is 0.5°. When the relation between the angle of rotation θ and the detent torque T is examined as for the performance of this motor, θ −T characteristics shown in FIG. 2 are acquired.

As is obvious from this drawing, the fluctuation width of the detent torque T is reduced to ½ or below in comparison with the overall uniform width type magnetization pattern of the related stepping motor (see FIG. 3). This means that when the magnetization portions 4 and 5 having the large width A are formed at two positions of the rotor magnet 3 in accordance With the magnetization pattern of the invention, the change of the magnetic flux density distribution that reduces the detent torque can be acquired.

In this case, because the magnetization portions 4 and 5 having the large width A are formed, the drop of the driving torque of the stepping motor occurs to some extents but this drop of the torque is extremely smaller than that of the pole non-formation type magnetization pattern of the related stepping motor. Though the drop of the driving portion torque is thus small in the magnetization pattern of the invention, the detent torque T can be reduced to a half or below and vibration and noise of the stepping motor can be drastically suppressed.

According to this embodiment, a magnetization pattern that makes torque fluctuation smooth during motor driving can be easily fabricated by only forming the magnetization portions 4 and 5 having the large width A at only two positions of the rotor magnet 3.

The condition of the magnetization pattern according to the invention will be hereby explained in further detail. When the total number of poles of the rotor magnet 3 is y, the angle obtained by dividing 360° by the total number of poles y is x°, an arbitrary angle smaller than the half of the angle x° is α° and the total number of the magnetization portions of the magnetization width A is Z, the condition is set so that the center angle A°=x°+(y/Z−1)α° with respect to the arcuate magnetization width A of the opposing magnetization portions 4 and 5 is greater than the center angle B° (x°−α°) with respect to the arcuate magnetization width B of the narrow magnetization portions 6. In other words, the opposing wide magnetization pattern according to the invention simultaneously satisfies the following conditional formulas (1), (2) and (3):

$$x°+(y/Z-1)\alpha°>(x°-\alpha°) \tag{1}$$

$$x°/2>\alpha° \tag{2}$$

$$x°=360°/y \tag{3}$$

So long as the opposing wide magnetization pattern described above Satisfies the three conditional formulas (1), (2) and (3), the wide magnetization portions 4 and 5 can create the change in the flux density distribution in their proximity and can reduce the detent torque. For example, the number of sets of the wide magnetization portions 4 and 5 opposing each other while interposing the center of revolution O of the rotor magnet 3 may be 2 sets at 4 positions in total by adding one more set at two positions to one set of the magnetization portions 4 and 5 at two positions opposing each other in the vertical direction In FIG. 1. In this case, two sets of wide magnetization portions 4 and 5 at four positions are arranged in an equal pitch of 90° in the circumferential direction of the rotor magnet described above.

When two sets of wide magnetization portions 4 and 5 are arranged on both sides of orthogonal biaxial directions, the reduction effect of the detent torque further increases in comparison with the came where one set of the magnetization portions 4 and 5 having the large width A are formed at two positions because the change of the magnetic flux density distribution of the rotor magnet 3 occurs in the transverse symmetric axes crossing each other and in the vertical symmetric axes crossing each other. In consequence, torque fluctuation during the operation of the stepping motor an be rendered further smooth.

Incidentally, various changes and modifications could be made to the invention without departing from the spirit thereof and the invention naturally embraces within its scope such modifications.

What is claimed is:

1. A magnetization pattern of a rotor magnet for a stepping motor, comprising:
    a plurality of magnetized portions formed along the direction of rotation of the rotor magnet, wherein
    the magnetized portions have opposing magnetic poles which are alternately arranged on the rotor magnet;
    some of the magnetized portions are of width A;
    each magnetized portion of width A is opposed to another magnetized portion of width A with the center of revolution of the rotor magnet interposed between each set of two opposed magnetized portions of width A;
    each of the magnetized portions not of width A is of uniform width B; and
    width A is greater than width B; and
        a total pole number of all the magnetized portions formed on the rotor magnet is defined as y,
        an angle obtained by dividing 360° by the total number of poles y is defined as x°,
        an arbitrary angle is defined as a°, a total number of said magnetized portions having the magnetization widths A is defined as z,
        a center angle with respect to each of the magnetization widths A of said magnetized portions is defined as A°, and
        a center angle with respect to each of the uniform widths B of said magnetized portions is defined as B°, the following equations are satisfied, $$A°=x°+(y/z-1)a°;$$

$$B°=(x°-a°);$$

$$x°+(y/z-1)a°>(x°-a°); \text{ and}$$

$$x°/2>a°.$$

2. The magnetization pattern as set forth in claim 1, wherein a total number of said some magnetized portions having the magnetization widths A comprises two sets of two magnetized portions each, constituting four magnetized portions in all; and
    wherein said four magnetized portions are arranged at 90 degree intervals in the rotation direction of the rotor magnet.

3. The magnetization pattern as set forth in claim 1, wherein a total number of said magnetized portions of width A comprises one set of two magnetized portions.

* * * * *